US008669468B2

(12) United States Patent
Yang et al.

(10) Patent No.: US 8,669,468 B2
(45) Date of Patent: *Mar. 11, 2014

(54) PHOTOELECTRIC CONVERSION MODULE

(75) Inventors: Nam-Choul Yang, Suwon-si (KR);
Jong-Ki Lee, Suwon-si (KR); Sung-Su Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 281 days.

This patent is subject to a terminal disclaimer.

(21) Appl. No.: 12/780,817

(22) Filed: May 14, 2010

(65) Prior Publication Data

US 2011/0174352 A1    Jul. 21, 2011

Related U.S. Application Data

(60) Provisional application No. 61/296,421, filed on Jan. 19, 2010.

(51) Int. Cl.
H01L 31/00    (2006.01)
H01L 31/042    (2006.01)
H02N 6/00    (2006.01)

(52) U.S. Cl.
USPC ............................. 136/263; 136/244; 136/251

(58) Field of Classification Search
USPC .................. 136/244, 263; 349/153, 154, 190; 359/272, 275
See application file for complete search history.

(56) References Cited

U.S. PATENT DOCUMENTS

| 5,582,653 | A | 12/1996 | Kataoka et al. | |
| 6,357,763 | B2 * | 3/2002 | Mathew et al. | 277/628 |
| 6,462,266 | B1 * | 10/2002 | Kurth | 136/251 |
| 2004/0238026 | A1 * | 12/2004 | Miyoshi | 136/263 |
| 2004/0258980 | A1 | 12/2004 | Ogura | |
| 2006/0219294 | A1 * | 10/2006 | Yabuuchi et al. | 136/263 |
| 2007/0020474 | A1 * | 1/2007 | Tosaki et al. | 428/522 |
| 2008/0236662 | A1 | 10/2008 | Ichikawa et al. | |
| 2009/0272433 | A1 | 11/2009 | Morooka et al. | |
| 2009/0293947 | A1 | 12/2009 | Higuchi et al. | |

FOREIGN PATENT DOCUMENTS

| JP | 2000-173680 | | 6/2000 |
| JP | 2000173680 A | * | 6/2000 |
| JP | 2001-357897 | | 12/2001 |
| JP | 2002-093475 | | 3/2002 |
| JP | 2003-100362 | | 4/2003 |
| JP | 2004-327167 | | 11/2004 |
| JP | 2005-216663 | | 8/2005 |

(Continued)

OTHER PUBLICATIONS

Machine translation of JP2000-173680A.*

(Continued)

Primary Examiner — Jeffrey T Barton
Assistant Examiner — Eric R Smith
(74) Attorney, Agent, or Firm — Christie, Parker & Hale, LLP

(57) ABSTRACT

A photoelectric conversion module including a first substrate; a second substrate spaced apart from the first substrate in a first direction; a plurality of photoelectric cells between the first and second substrates, each including an electrolyte; and a sealing member between the first and second substrates, the sealing member surrounding the plurality of photoelectric cells and extending between adjacent photoelectric cells of the plurality of photoelectric cells, wherein the sealing member has at least one electrolyte injecting portion for receiving the electrolyte into the photoelectric cells.

11 Claims, 9 Drawing Sheets

(56) References Cited

FOREIGN PATENT DOCUMENTS

| | | |
|---|---|---|
| JP | 2005-285781 | 10/2005 |
| JP | 2006-004827 | 1/2006 |
| JP | 2006-324090 | 11/2006 |
| JP | 2007-018909 | 1/2007 |
| JP | 2007-109500 | 4/2007 |
| JP | 2007-220606 | 8/2007 |
| JP | 2007-280906 | 10/2007 |
| JP | 2007-311218 | 11/2007 |
| JP | 2007-328960 | 12/2007 |
| JP | 2008-153013 | 7/2008 |
| JP | 2008-311215 | 12/2008 |
| JP | 2009-129651 | 6/2009 |
| JP | 2009129651 A * | 6/2009 |
| JP | 2009-231008 | 10/2009 |
| KR | 1020080112280 | 12/2008 |
| KR | 10-0928009 B1 | 11/2009 |
| KR | 10-2010-0008068 | 1/2010 |
| WO | WO 2006/015431 A | 2/2006 |
| WO | WO 2009/123305 A1 | 10/2009 |
| WO | WO 2010042170 A2 * | 4/2010 |
| WO | WO 2010/137781 A1 | 12/2010 |

OTHER PUBLICATIONS

Machine translation of JP2006-004827A.*
KIPO Notice of Allowance dated Aug. 12, 2011 issued in corresponding KR 10-2010-0062074, 5 pages.
Machine English Translation of JP 2005-285781, 39 pages.
Machine English Translation of JP 2007-328960, 24 pages.
KIPO Office action dated May 4, 2011, for Korean Patent application 10-2010-0001879, (5 pages).
KIPO Registration Determination Certificate dated Dec. 15, 2011, for Korean Patent application 10-2010-0001879, (5 pages).
English machine translation of Japanese Publication 2003-100362 listed above (42 pages).
Japanese Office action dated Nov. 27, 2012, for corresponding Japanese Patent application 2010-254921, (3 pages).
Patent Abstracts of Japan, and English machine translation of Japanese Publication 2001-357897 listed above, (43 pages).
Patent Abstracts of Japan, and English machine translation of Japanese Publication 2002-093475 listed above, (27 pages).
Patent Abstracts of Japan, and English machine translation of Japanese Publication 2006-324090 listed above, (35 pages).
Patent Abstracts of Japan, and English machine translation of Japanese Publication 2007-018909 listed above, (38 pages).
Patent Abstracts of Japan, and English machine translation of Japanese Publication 2007-311218 listed above, (23 pages).
Patent Abstracts of Japan, and English machine translation of Japanese Publication 2009-231008 listed above, (35 pages).
EPO Search Report dated Jul. 18, 2013, for corresponding European Patent application 10166069.4, (5 pages).
JPO Office action dated Jul. 9, 2013, for corresponding Japanese Patent application 2010-254921, (3 pages).
Patent Abstracts of Japan, and English machine translation of Japanese Publication 2005-216663 dated Aug. 11, 2005, listed above, (26 pages).
Patent Abstracts of Japan, and English machine translation of Japanese Publication 2007-109500 dated Apr. 26, 2007, listed above, (14 pages).

* cited by examiner

PHOTOELECTRIC CONVERSION MODULE

CROSS-REFERENCE TO RELATED APPLICATION

This application claims priority to and the benefit of U.S. Provisional Application No. 61/296,421, filed on Jan. 19, 2010 in the United States Patent and Trademark Office, the entire content of which is incorporated herein by reference.

BACKGROUND

1. Field

Aspects of embodiments of the present invention relate to a photoelectric conversion module, and more particularly, to a photoelectric conversion module having a structure for sealing electrolyte.

2. Description of the Related Art

Recently, various research has been conducted in the area of photoelectric conversion modules that convert optical energy into electric energy as a source of energy that may substitute for fossil fuel, and solar batteries using solar light have been identified.

Research about solar batteries operating in various ways has been conducted. In addition, silicon or crystalline solar batteries formed as wafers using p-n junction of a semiconductor are widely distributed; however, fabrication costs increase due to processes of working with semiconductor materials of high purity.

Unlike silicon solar batteries, dye-sensitized solar batteries include a photosensitive dye receiving light of a wavelength of visible ray band for generating excited electrons, a semiconductor material receiving the excited electrons, and an electrolyte reacting with the electrons returning from an external circuit. Dye-sensitized solar batteries are considered as next-generation solar batteries due to a photoelectric conversion efficiency which is much greater than that of conventional solar batteries.

SUMMARY

According to an aspect of embodiments of the present invention, a photoelectric conversion module has improved durability and reliability. According to another aspect of embodiments of the present invention, a photoelectric conversion module is adapted to be mass-produced.

According to one embodiment, a photoelectric conversion module includes a first substrate; a second substrate spaced apart from the first substrate in a first direction; a plurality of photoelectric cells between the first and second substrates, each including an electrolyte; and a sealing member between the first and second substrates, the sealing member surrounding the plurality of photoelectric cells and extending between adjacent photoelectric cells of the plurality of photoelectric cells, wherein the sealing member has at least one electrolyte injecting portion for receiving the electrolyte into the photoelectric cells.

In one embodiment, the sealing member seals the electrolyte in the photoelectric cells. In one embodiment, the photoelectric cells include a first electrode on the first substrate and a second electrode on the second substrate. The photoelectric cells may further include a semiconductor layer on the first electrode. The semiconductor layer may include a photosensitive dye. In one embodiment, the photoelectric cells further include a catalyst layer on the second electrode.

In one embodiment, the sealing member includes a first portion surrounding the plurality of photoelectric cells and at least one second portion extending between the adjacent photoelectric cells in a second direction crossing the first direction. The adjacent photoelectric cells may be electrically connected to each other through a connecting member. The connecting member may connect an electrode of a first photoelectric cell of the adjacent photoelectric cells and an electrode of a second photoelectric cell of the adjacent photoelectric cells. In one embodiment, the connecting member extends within the at least one second portion of the sealing member in the second direction. The connecting member may be formed of a conductive paste.

In one embodiment, the at least one electrolyte injecting portion includes a plurality of electrolyte injecting portions, and each of the electrolyte injecting portions includes an opening formed through an end of the sealing member and in communication with a respective one of the photoelectric cells for injecting the electrolyte therethrough into the respective one of the photoelectric cells.

In one embodiment, the at least one electrolyte injecting portion includes at least one injection portion sealing member sealing at least one opening formed through an end of the sealing member for injecting the electrolyte into the plurality of photoelectric cells. A photoelectric conversion module may further include a sealing block coupled to the sealing member adjacent the at least one electrolyte injection portion for sealing the electrolyte in the photoelectric cells together with the at least one injection portion sealing member. A photoelectric conversion module may further include a sealing material between the sealing block and the sealing member. In one embodiment, the sealing material includes an adhering sheet adhering the sealing block to at least one of the first substrate or the second substrate, and a blocking sheet adjacent the adhering sheet for blocking leakage of the electrolyte from the photoelectric cells. The sealing material may further include another adhering sheet, and the blocking sheet may include a metal plate between the adhering sheet and the another adhering sheet.

In one embodiment, the second substrate includes a portion extended beyond an end surface of the first substrate in a second direction crossing the first direction, and the sealing block is located on the extended portion of the second substrate and covers the end surface of the first substrate. A photoelectric conversion module may further include a sealing material between the sealing block and the end surface of the first substrate and a sealing material between the sealing block and the extended portion of the second substrate. The sealing material between the sealing block and the end surface of the first substrate and the sealing material between the sealing block and the extended portion of the second substrate may be continuously formed.

According to another aspect of embodiments of the present invention, in a photoelectric conversion module, it is not necessary to form holes in a substrate in order to inject an electrolyte into the substrate, and thus, fabrication costs of the substrate are reduced, and fabrication processes are simplified to increase production yield. In addition, degradation of rigidity of the substrate caused by holes in the substrate is avoided, and durability of the photoelectric conversion module is improved.

According to another aspect of embodiments of the present invention, in a photoelectric conversion module, a sealing block is attached along a side of a substrate, in which electrolyte injecting portions are formed, and a double-sealing structure is formed, thereby preventing or substantially preventing infiltration of external impurities, and also preventing or substantially preventing deterioration or leakage of the electrolyte.

BRIEF DESCRIPTION OF THE DRAWINGS

The above and other features and advantages of the present invention will become more apparent by describing in detail some exemplary embodiments thereof with reference to the attached drawings.

DESCRIPTION OF REFERENCE NUMERALS INDICATING SOME ELEMENTS IN THE DRAWINGS

Figure 1:
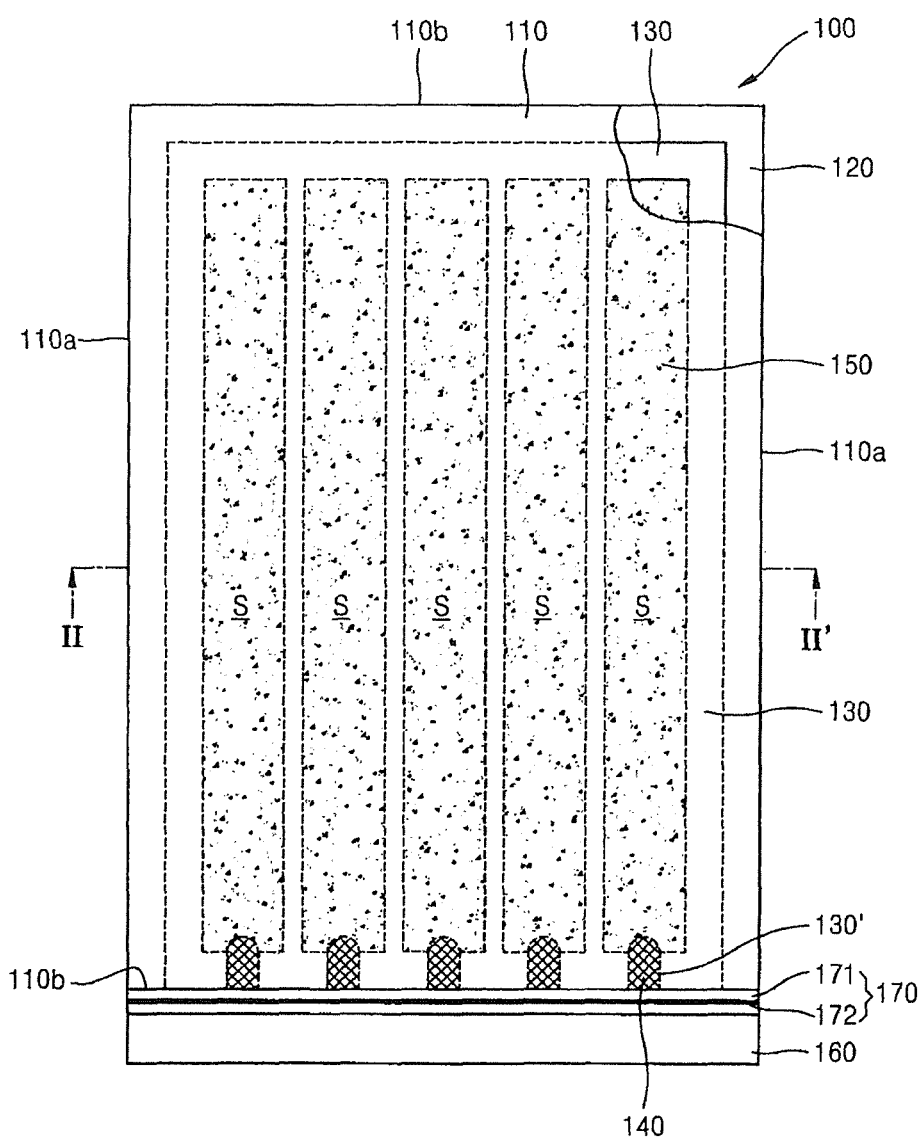
FIG. 1 is a plan view of a photoelectric conversion module according to an embodiment of the present invention.

| | |
|---|---|
| 100: photoelectric conversion module | 110: light receiving substrate |
| 110a: long side portion | 110b: short side portion |
| 111: photo electrode | 113: semiconductor layer |
| 115, 125: functional layers | 120: counter substrate |
| 121: counter electrode | 123: catalyst layer |
| 130: sealing member | 130': electrolyte injecting portion |
| 131: first portion | 132: second portion |
| 140: injecting portion sealing member | 150: electrolyte |
| 160: sealing block | 170: sealing material |
| 171: adhering sheet | 172: blocking sheet |
| 180: connection member | 181: receiving space |
| B: electrolyte tub | C: sealed chamber |
| S: photoelectric cell | |

DETAILED DESCRIPTION

Some exemplary embodiments will now be described more fully hereinafter with reference to the accompanying drawings; however, embodiments of the present invention may be embodied in different forms and should not be construed as limited to the exemplary embodiments illustrated and set forth herein. Rather, these exemplary embodiments are provided by way of example for understanding of the invention and to convey the scope of the invention to those skilled in the art. As those skilled in the art would realize, the described embodiments may be modified in various different ways, all without departing from the spirit or scope of the present invention. Like reference numerals designate like elements throughout the specification and drawings.

FIG. 1 shows a planar structure of a photoelectric conversion module 100 according to an embodiment of the present invention. Referring to FIG. 1, in one embodiment, the photoelectric conversion module 100 includes a plurality of photoelectric cells S and a sealing member 130 disposed between neighboring photoelectric cells S to define the photoelectric cells S and divide the photoelectric cells S from each other. For example, in one embodiment, each of the photoelectric cells S is connected to a neighboring photoelectric cell S in series or in parallel via a connection member (not shown), and physically supported between a light receiving substrate 110 and a counter substrate 120 to be modulated.

In one embodiment, an electrolyte 150 is filled in each of the photoelectric cells S, and the electrolyte 150 filled in the photoelectric cells S is sealed by the sealing member 130 that is disposed along a boundary of the photoelectric conversion module 100 and between the neighboring photoelectric cells S. The sealing member 130 is formed around the electrolyte 150 so as to surround the electrolyte 150, and seals the electrolyte 150 in order to prevent or substantially prevent leakage of the electrolyte 150.

The light receiving substrate 110, in one embodiment, may be formed having a generally rectangular shape having long side portions 110a extending in parallel with each other, and short side portions 110b extending in parallel with each other perpendicularly to the long side portions 110a. In one embodiment, one or more parts of the sealing member 130 are open along a side of the light receiving substrate 110 (e.g., one of the short side portions 110b) to provide electrolyte injecting portions 130', which correspond to the photoelectric cells S. The electrolyte 150 is injected into the photoelectric conversion module 100 through the electrolyte injecting portions 130'. After injecting the electrolyte 150, in one embodiment, the electrolyte injection portions 130' are filled with sealing paste to form injecting portion sealing members 140. In one embodiment, because the electrolyte 150 is injected through the electrolyte injecting portions 130' and the injection portion sealing members 140 seal the electrolyte injecting portions 130' after finishing the injection operation of the electrolyte 150, a specialized compressing device for injecting electrolyte (e.g., a syringe) is not necessary in order to inject the electrolyte 150. In addition, after finishing the injecting operation of the electrolyte 150, the electrolyte injecting portions 130' are sealed by the injecting portion sealing members 140, and thus, the sealing of the electrolyte injecting portions 130' may be easily performed.

The injecting portion sealing members 140 may include any material that seals the electrolyte 150 in the photoelectric cells S, such as a resin or a glass frit, for example. In one embodiment, the injecting portion sealing members 140 may be formed of a material that is selectively flexible according to a temperature environment. For example, in one embodiment, the injecting portion sealing members 140 may be formed of a material that is sufficiently flexible to be applied on the electrolyte injecting portions 130' at a high temperature, and is hardened to seal the electrolyte injecting portions 130' at an operating temperature range. In one embodiment, the injecting portion sealing members 140 may be formed of a resin material such as an acrylic-based resin, an epoxy-based resin, a silicon-based resin, an olefin-based resin, an olefin-acrylate based resin, or a glass frit. In one embodiment, the injecting portion sealing members 140 may be formed of a photosensitive material that has a flexibility varying depending on light irradiation, and/or a temperature sensitive material that has a flexibility varying depending on the temperature environment.

In one embodiment, a sealing block 160 is disposed on an outer portion of the injecting portion sealing member 140. The sealing block 160, in one embodiment, is disposed along the short side portion 110b to seal the electrolyte injecting portions 130'. That is, in one embodiment, the sealing block 160 contacts the short side portion 110b of the light receiving substrate 110 so as to seal the electrolyte injecting portions 130'. The sealing block 160, in one embodiment, forms a double-sealing structure along with the injecting portion sealing members 140.

Figure 2:
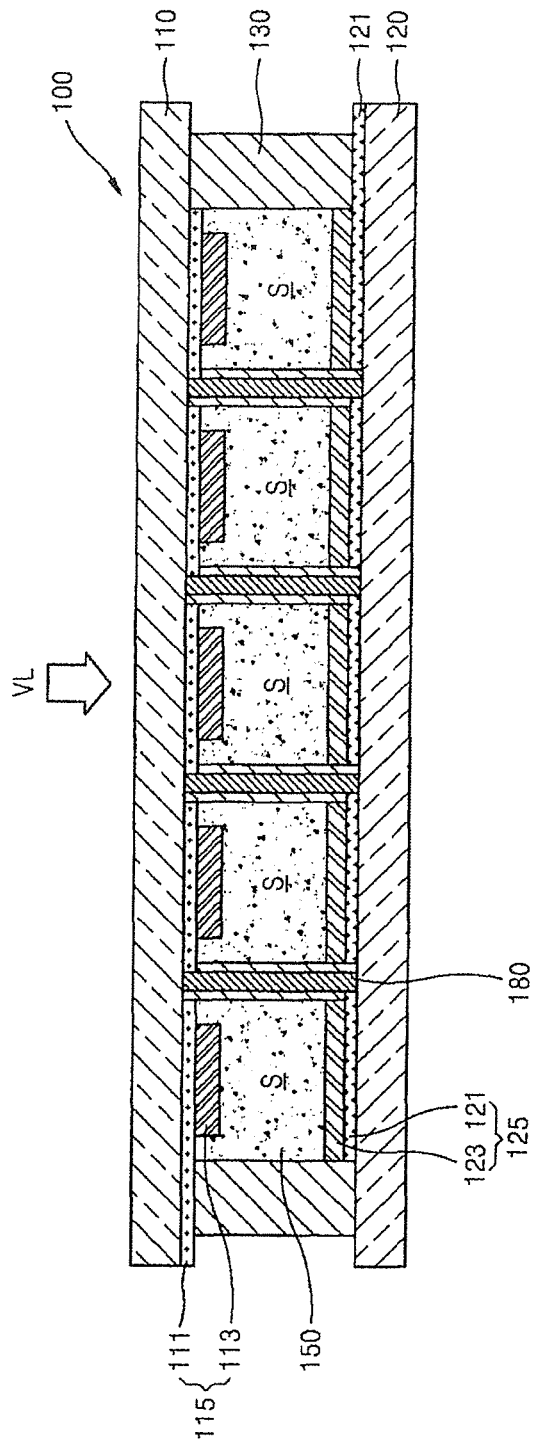
FIG. 2 is a cross-sectional view of the photoelectric conversion module of FIG. 1 taken along line II-II'.

FIG. 2 is a cross-sectional view of the photoelectric conversion module 100 taken along line II-II' of FIG. 1. Referring to FIG. 2, the photoelectric conversion module 100 includes the light receiving substrate 110 and the counter substrate 120 facing each other. In addition, the plurality of photoelectric cells S which are defined by the sealing member 130 are formed between the light receiving substrate 110 and the counter substrate 120. In addition, in one embodiment, connecting members 180 are disposed between the neighboring photoelectric cells S to connect the photoelectric cells S to each other, such as in series, for example.

In one embodiment, a photo electrode 111 and a counter electrode 121 are respectively formed on the light receiving substrate 110 and the counter substrate 120, and the light receiving substrate 110 and the counter substrate 120 are attached to each other with a predetermined gap therebetween and having the sealing member 130 interposed therebetween. A semiconductor layer 113, on which a photosensitive dye that is excited by light is adhered, is formed on the photo electrode 111, and the electrolyte 150 is disposed between the semiconductor layer 113 and the counter electrode 121.

The light receiving substrate 110, in one embodiment, is formed of a transparent material having a high light transmittance. For example, the light receiving substrate 110 may be formed of a glass or a resin film. The resin film may be a flexible resin film that is suitable for applications requiring flexibility.

The photo electrode 111, in one embodiment, functions as a negative electrode of the photoelectric conversion module 100 and, in more detail, the photo electrode 111 collects the electrons that are generated by the photoelectric conversion operation to provide a current path. The light VL incident through the photo electrode 111 excites the photosensitive dye adhered on the semiconductor layer 113. The photo electrode 111, in one embodiment, is formed of a transparent conducting oxide (TCO), such as an indium tin oxide (ITO), a fluorine doped tin oxide (FTO), or an antimony doped tin oxide (ATO). The photo electrode 111 may further include a metal electrode such as gold (Ag), silver (Au), or aluminum (Al) having a high electrical conductivity. The metal electrode, in one embodiment, is introduced in order to reduce the electrical resistance of the photo electrode 111, and may be formed in a stripe pattern or a mesh pattern.

The semiconductor layer 113, in one embodiment, is formed of a semiconductor material that is conventionally used as a photoelectric conversion device, such as an oxide material of metal such as cadmium (Cd), zinc (Zn), indium (In), lead (Pb), molybdenum (Mo), tungsten (W), antimony (Sb), titanium (Ti), silver (Ag), manganese (Mn), tin (Sn), zirconium (Zr), strontium (Sr), gallium (Ga), silicon (Si), or chromium (Cr), for example. The semiconductor layer 113, in one embodiment, increases the photoelectric conversion efficiency due to the photoelectric dye attached thereon. For example, in one embodiment, the semiconductor layer 113 may be formed by applying a paste, in which semiconductor particles each having a diameter of about 5 nm to about 1000 nm are dispersed, on the light receiving substrate 110 on which the photo electrode 111 is formed, and subsequently performing a heating process or a compressing process for applying a predetermined heat or pressure onto the paste.

The photosensitive dye attached on the semiconductor layer 113 absorbs the light VL that is incident by transmitting through the light receiving substrate 110, and electrons of the photosensitive dye are excited from a base state to an excitation state. The excited electrons are moved to a conduction band of the semiconductor layer 113 by an electric bonding between the photosensitive dye and the semiconductor layer 113, and reach the photo electrode 111 after passing through the semiconductor layer 113. Thereafter, the electrons are withdrawn to the outside via the photo electrode 111 to form a driving current that drives an external circuit.

For example, in one embodiment, the photosensitive dye attached on the semiconductor layer 113 includes molecules that absorb the light of visible ray wavelength and accelerate the transition of electrons to the semiconductor layer 113 in the excitation state. The photosensitive dye may be a liquid phase, a gel phase, or a solid phase. In one embodiment, the photosensitive dye attached on the semiconductor layer 113 may be a ruthenium-based photosensitive dye. When the light receiving substrate 110 on which the semiconductor layer 113 is formed is digested in a solution including a predetermined photosensitive dye, the semiconductor layer 113 on which the photosensitive dye is attached may be obtained.

The electrolyte 150, in one embodiment, is a Redox electrolyte that includes a pair of oxidant and reductant, and a solid type electrolyte, a gel type electrolyte, or a liquid type electrolyte may be used as the electrolyte 150.

In one embodiment, it is not necessary that the counter substrate 120 facing the light receiving substrate 110 be transparent. However, in one embodiment, the counter substrate 120 is formed of a transparent material such that the photoelectric conversion module 100 is configured for receiving light from both sides in order to increase the photoelectric conversion efficiency, and, in one embodiment, the counter substrate 120 may be formed of the same material as the light receiving substrate 110.

In particular, in an embodiment in which the photoelectric conversion module 100 is utilized as a building integrated photovoltaic (BIPV) that is installed in a structure such as window frame, the photoelectric conversion module 100 is transparent on both sides in order to not block the light VL directed at the house.

The counter electrode 121, in one embodiment, functions as a positive electrode of the photoelectric conversion module 100. The photosensitive dye attached on the semiconductor layer 113 is excited upon receiving the light VL, and the excited electrons are withdrawn to the outside via the photo electrode 111. The photosensitive dye losing the electrons is reduced by collecting the electrons that are provided by oxidation of the electrolyte 150, and the oxidated electrolyte 150 is reduced by the electrons reaching the counter electrode 121 via the external circuit, after which the operation of the photoelectric conversion is complete.

In one embodiment, the counter electrode 121 is formed of the TCO, such as the ITO, FTO, or ATO that is a transparent material discussed above having electrical conductivity. The counter electrode 121, in one embodiment, may further include a metal electrode such as Ag, Au, or Al having a high electrical conductivity. The metal electrode may be introduced in order to reduce the electrical resistance of the counter electrode 121, and may be formed in a stripe pattern or a mesh pattern.

In one embodiment, a catalyst layer 123 is formed on the counter electrode 121. The catalyst layer 123, in one embodiment, is formed of a material having a reduction catalyst function for providing electrons, such as a metal material including platinum (Pt), Ag, Au, copper (Cu), or Al, for example, a metal oxide, such as a tin oxide, for example, or a carbon-based material, such as graphite.

In one embodiment, the sealing member 130 formed between the light receiving substrate 110 and the counter substrate 120 maintains a constant distance between the light receiving substrate 110 and the counter electrode 120, and also defines the plurality of photoelectric cells S that are disposed between the light receiving substrate 110 and the counter substrate 120. In addition, the sealing member 130 surrounds the electrolyte 150 injected in the photoelectric conversion module 100 to seal the electrolyte 150 in the photoelectric cells S. The sealing member 130, in one embodiment, is formed of a thermosetting resin, such as epoxy, a thermoplastic resin, such as ionomer, a photocurable resin, such as an ultraviolet (UV)-curable epoxy, or any other suitable material.

The connection member 180 electrically connects the photoelectric cells S to each other and is disposed adjacent to the sealing member 130. For example, in one embodiment, the connection member 180 is formed within a space that is defined by the sealing member 130, and may penetrate through the sealing member 130. The connection member 180, in one embodiment, extends vertically so as to reach the photo electrode 111 and the counter electrode 121 that are disposed on upper and lower portions of the connection member 180, and connects the photo electrode 111 and the counter electrode 121 of the neighboring photoelectric cells S to connect the photoelectric cells S, such as in series. The connection member 180, in one embodiment, is formed of a metal material having a high electrical conductivity. In one embodiment, a conductive paste is filled in a space defined in the sealing member 130 to form the connection member 180.

Figure 3:
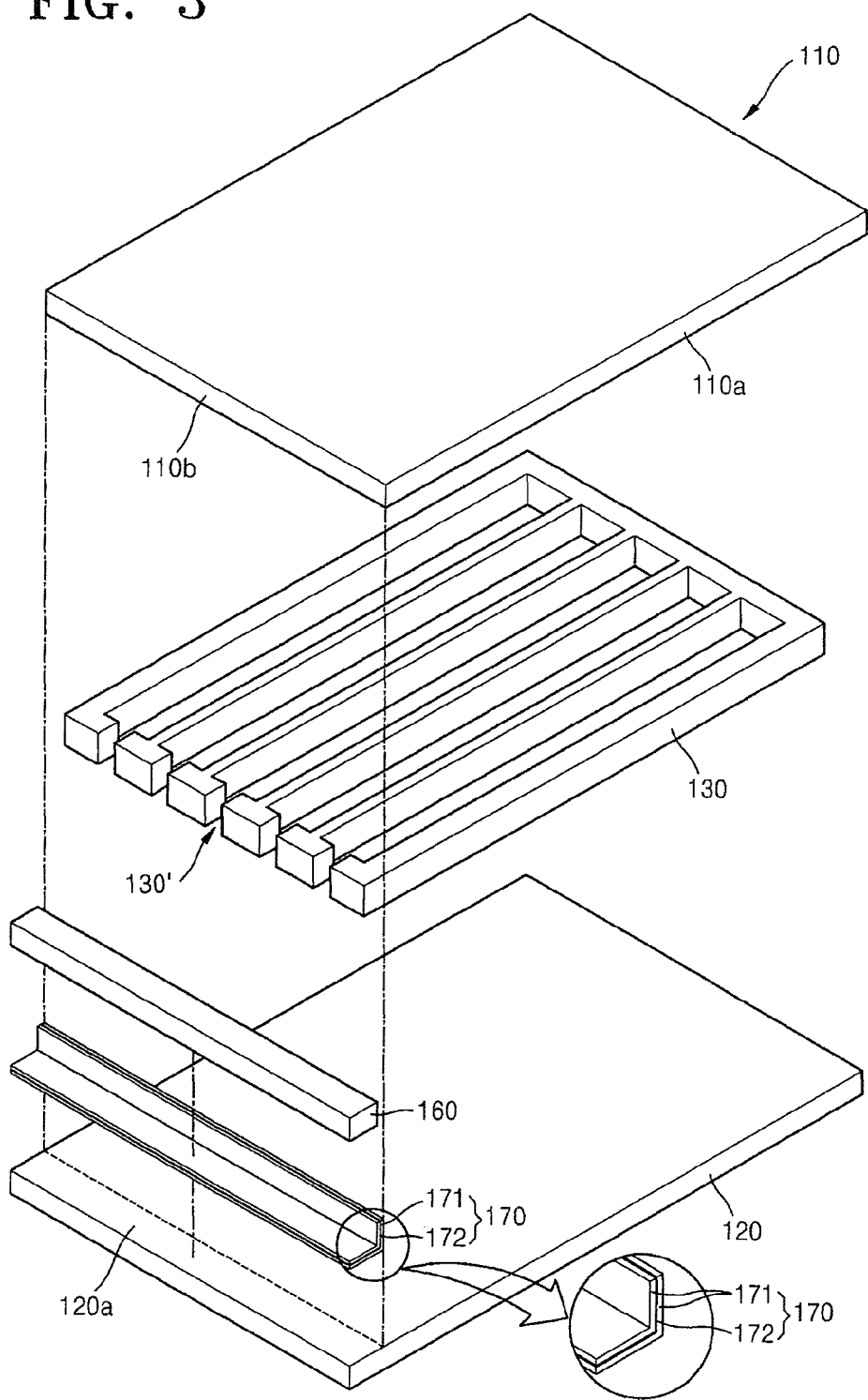
FIG. 3 is an exploded perspective view of the photoelectric conversion module of FIG. 1.
Figure 4:
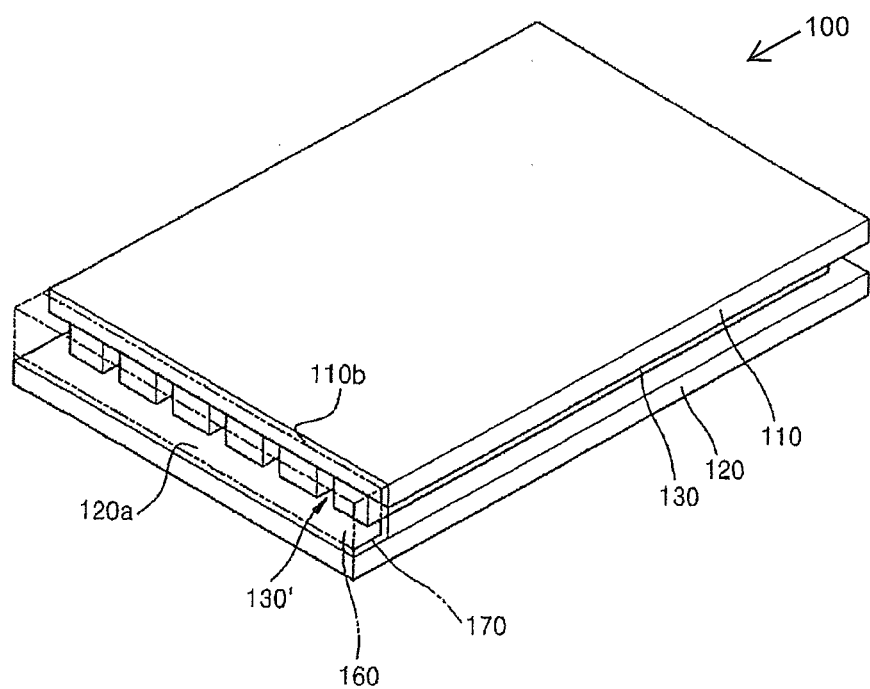
FIG. 4 is a perspective view showing an assembled state of a sealing block of the photoelectric conversion module of FIG. 1.

FIG. 3 is an exploded perspective view, and FIG. 4 is a perspective view showing an assembled state of the photoelectric conversion module 100. For the sake of clarity, functional layers 115 and 125 (see FIG. 2) that are formed on the light receiving substrate 110 and the counter substrate 120 for performing the photoelectric conversion operations (e.g., the photo electrode 111, the counter electrode 121, the semiconductor layer 113, and the catalyst layer 123) are not shown in FIGS. 3 and 4. Referring to FIGS. 3 and 4, the light receiving substrate 110 and the counter substrate 120 are coupled or attached to each other through the sealing member 130 interposed therebetween, so as to face each other. In one embodiment, the light receiving substrate 110 and the counter substrate 120 are coupled to each other so that an edge of the counter substrate 120 is exposed to an outer side of the light receiving substrate 110. In addition, in one embodiment, the sealing block 160 is disposed on the part of the counter substrate 120 which is exposed at the side of the light receiving substrate 110. The sealing block 160, in one embodiment, contacts surfaces 110b and 120a of exposed portions of the light receiving substrate 110 and the counter substrate 120, respectively, and, in particular, contacts a side surface 110b of the light receiving substrate 110 and an upper surface 120a of the counter substrate 120. The sealing block 160, in one embodiment, is formed as a square pillar and is closely adhered to the exposed surfaces of the light receiving substrate 110 and the counter substrate 120. However, in other embodiments, the sealing block 160 may be formed having various shapes and from various materials for sealing the electrolyte injecting portions 130'. For example, the sealing block 160 may be formed of a plastic material, a glass material, a metal material, or any other suitable material for sealing the electrolyte injecting portions 130'.

In one embodiment, a sealing material 170 is disposed along the exposed surfaces 110b and 120a of the light receiving substrate 110 and the counter substrate 120, respectively, and the sealing block 160 is coupled to the exposed surfaces 110b and 120a and interposing the sealing material 170. In one embodiment, the sealing material 170 includes an adhering sheet 171 for attachment between the exposed surfaces 110b and 120a and the sealing block 160, and may further include a blocking sheet 172 for preventing or substantially preventing leakage of the electrolyte 150. The adhering sheet 171, in one embodiment, is formed of a resin film having an adhesive characteristic, and the blocking sheet 172 may be formed of a thin metal plate, such as a thin Al plate or any other suitable material.

Figure 5:
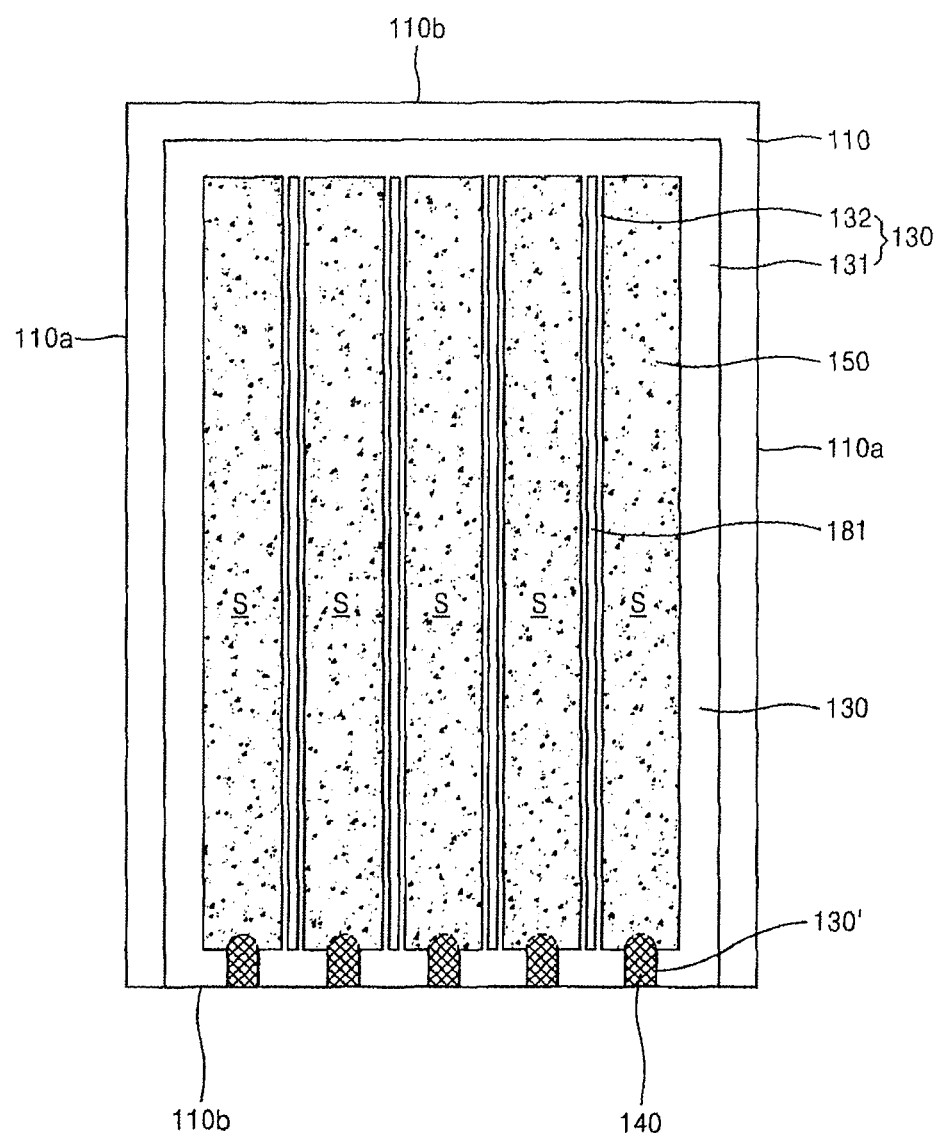
FIG. 5 is a bottom cutaway view showing a sealing member of the photoelectric conversion module of FIG. 1.

FIG. 5 shows a planar structure of the sealing member 130. Referring to FIG. 5, in one embodiment, the sealing member 130 extends along the long side portions 110a and the short side portions 110b of the light receiving substrate 110 so as to from a space for receiving the electrolyte 150, and extends toward the inner area of the light receiving substrate 110 so as to define the plurality of photoelectric cells S that are arranged between the light receiving substrate 110 and the counter substrate 120. In one embodiment, the sealing member 130 includes a first portion 131 extending to surround the long side portions 110a and the short side portions 110b, and second portions 132 formed in a region corresponding to the inner area of the light receiving substrate 110 to define the photoelectric cells S and separate the photoelectric cells S from neighboring ones of the photoelectric cells S. In one embodiment, the electrolyte injecting portions 130' are formed in a side of the first portion 131 extending along the long side portions 110a and the short side portions 110b, such as in a side corresponding to one of the short side portions 110b, for example. After completing the injection of the electrolyte 150, the injecting portion sealing member 140 is formed to prevent or substantially prevent leakage of the electrolyte 150 from the electrolyte injecting portions 130'. Further, in one embodiment, as shown in FIG. 5, receiving spaces 181 for receiving the connecting members 180 that electrically connect the neighboring photoelectric cells S to each other may be formed in the second portions 132 of the sealing member 130.

Figure 6A:
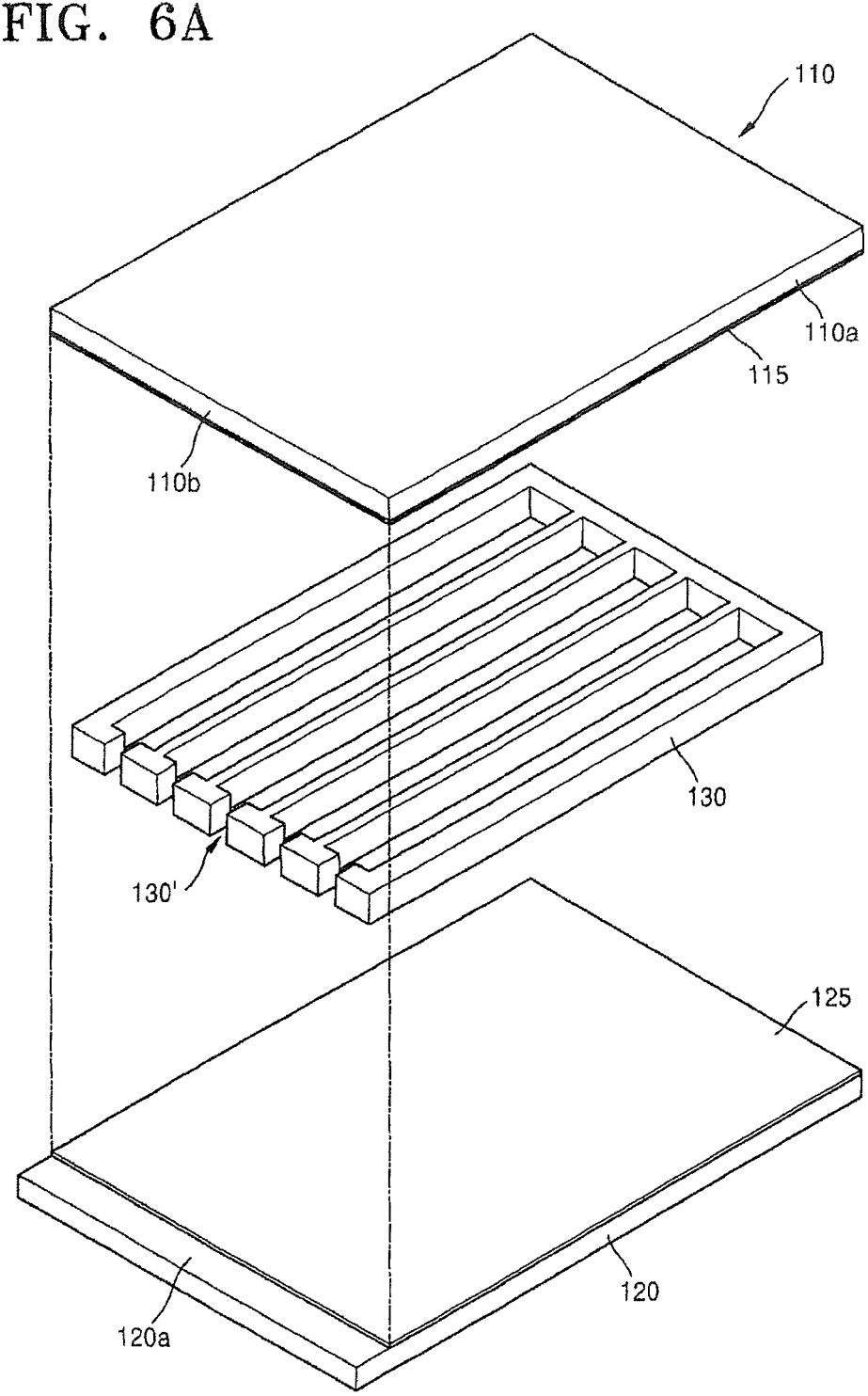
FIGS. 6A through 6C are schematic views illustrating processes of fabricating the photoelectric conversion module of FIG. 1.
Figure 6B:
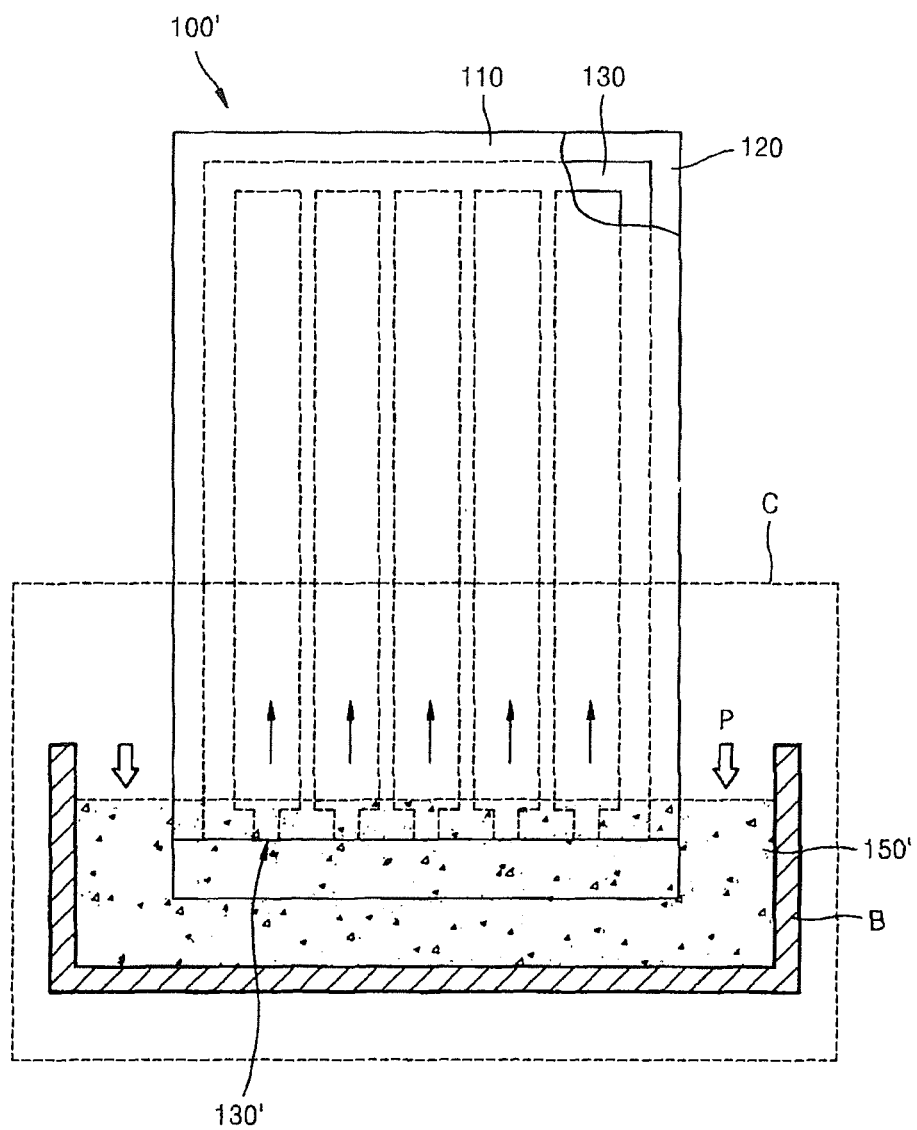
Figure 6C:
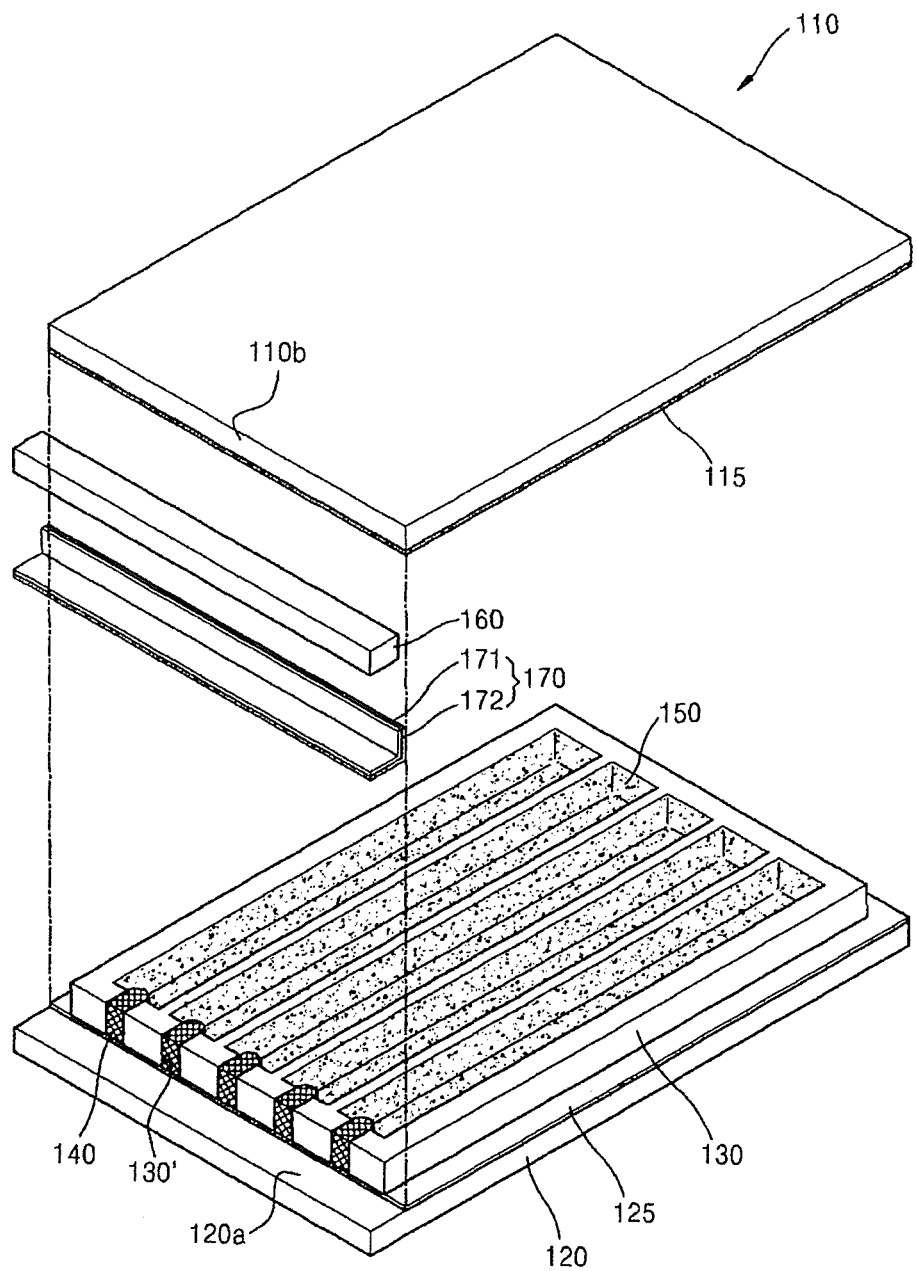

FIGS. 6A through 6C are schematic views illustrating processes of fabricating the photoelectric conversion module 100 according to one embodiment. Referring to FIG. 6A, the light receiving substrate 110 and the counter substrate 120, on which the functional layers 115 and 125 for performing the photoelectric conversion are respectively formed, are prepared. For example, the functional layers 115 and 125 may include the semiconductor layer 113 for receiving the light and generating excited electrons, the photo electrode 111 and the counter electrode 121 for forming current paths of the generated electrons, and the catalyst layer 123 for performing catalyst operation of the electrolyte 150.

In one embodiment, the light receiving substrate 110 and the counter substrate 120 are disposed to face each other, the sealing member 130 is disposed between the light receiving substrate 110 and the counter substrate 120, and then, the light receiving substrate 110 and the counter substrate 120 are attached to each other by applying predetermined heat and/or pressure onto the light receiving substrate 110 and the counter substrate 120. In one embodiment, the sealing member 130 provides the electrolyte injecting portions 130', such as through openings formed along a side thereof.

In one embodiment, the electrolyte 150 is injected through the electrolyte injecting portions 130'. For example, in one embodiment, as shown in FIG. 6B, a substrate assembly 100' including the attached light receiving substrate 110 and the counter substrate 120 is stood upright and soaked in an electrolyte tub B in which an electrolyte solution 150' is filled, in a state where the electrolyte injecting portions 130' face downward. The injecting operation of the electrolyte 150 may be executed in a sealed chamber C, for example, under an atmosphere in which an inert gas is filled in the chamber C at a predetermined gas pressure P. In one embodiment, the electrolyte solution 150' in the electrolyte tub B may be injected into the substrate assembly 100' due to the gas pressure P.

After finishing the injection of the electrolyte 150, the sealing operation of the electrolyte injecting portions 130' is performed. For example, as shown in FIG. 6C, the injecting portion sealing members 140 are formed on the electrolyte injecting portions 130' to seal the electrolyte injecting portions 130'. In addition, in one embodiment, the sealing block 160 is attached to outer portions of the injecting portion sealing members 140. For example, the sealing block 160, in one embodiment, is attached onto the part of the counter substrate 120 exposed under the light receiving substrate 110. In one embodiment, the sealing block 160 is attached onto the side surface 110b of the light receiving substrate 110 and the upper surface 120a of the counter substrate 120 and may be interposing the sealing material 170.

Figure 7:
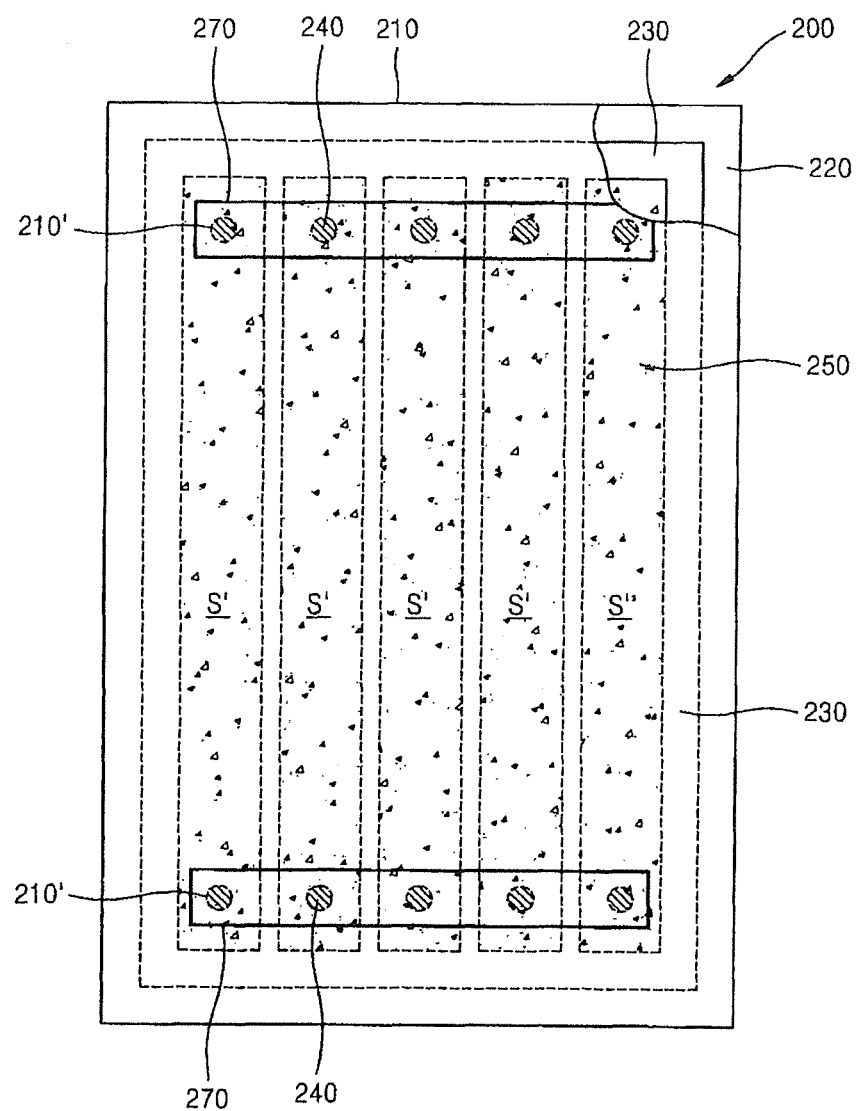
FIG. 7 is a plan view of a photoelectric conversion module according to a comparative example.

FIG. 7 shows a planar structure of a photoelectric conversion module 200 according to a comparative example. Referring to FIG. 7, the photoelectric conversion module 200 includes a first substrate 210 and a second substrate 220 attached to each other, and a plurality of photoelectric cells S' arranged between the first and second substrates 210 and 220. A sealing member 230 is disposed between the first and second substrates 210 and 220. The sealing member 230 extends along boundaries of the first and second substrates 210 and 220 to form a space in which an electrolyte 250 is injected, and extends to an inner area between the first and second substrates 210 and 220 to define the plurality of photoelectric cells S'.

Electrolyte injecting holes 210' are formed in the first substrate 210 for injecting the electrolyte 250. The electrolyte injecting holes 210' are formed at locations corresponding to the photoelectric cells S', and may be formed as a pair of holes per each of the photoelectric cells S', for example. After finishing the injection of the electrolyte 250, sealing plugs 240 may be inserted in the electrolyte injecting holes 210', or a sealing cap 270 may extend across a row of the electrolyte injecting holes 210' for sealing the electrolyte injecting holes 210'.

In the photoelectric conversion module 200 according to the comparative example, the electrolyte 250 is injected through the electrolyte injecting holes 210' that are relatively narrower than those of the embodiments of the present invention, and thus, an additional compressing unit, such as a syringe, is necessary. In addition, since the plurality of injecting holes 210' are formed in the substrate 210, fabrication costs of the substrate increase and strength of the substrate 210 is degraded. In addition, the sealing operation is performed with respect to each of the electrolyte injecting holes 210', and thus, the number of processes increases.

In the photoelectric conversion module 100 of FIG. 1, the electrolyte 150 is injected via the electrolyte injecting portions 130' which, in one embodiment, are open along the short side portion 110b of the substrate 110, and thus, the injection of the electrolyte 150 may be performed easily without using an additional compressing unit. In addition, holes are not formed in the light receiving substrate 110 and the counter substrate 120, and thus, high rigidity of the light receiving substrate 110 and the counter substrate 120 is maintained.

It should be understood that the exemplary embodiments described herein should be considered in an illustrative sense only and not for purposes of limitation. Descriptions of features or aspects within each embodiment should typically be considered as available for other similar features or aspects in other embodiments. That is, it should be understood that the invention is not limited to the disclosed embodiments, but, on the contrary, is intended to cover various modifications and equivalent arrangements included within the spirit and scope of the appended claims.

What is claimed is:

1. A photoelectric conversion module comprising:
a first substrate;
a second substrate spaced apart from the first substrate in a first direction;
a plurality of photoelectric cells between the first and second substrates, each comprising an electrolyte;
a sealing member between the first and second substrates and sealing the electrolyte in the photoelectric cells, the sealing member surrounding the plurality of photoelectric cells and extending between adjacent photoelectric cells of the plurality of photoelectric cells,
the sealing member having a plurality of electrolyte injecting portions, each of the electrolyte injecting portions being defined by a respective part of the sealing member that is open through an end of the sealing member from a top surface of the sealing member to a bottom surface of the sealing member and in communication with a respective one of the photoelectric cells for receiving the electrolyte therethrough into the respective one of the photoelectric cells, the sealing member including at least one injection portion sealing member sealing the electrolyte injecting portions;
a sealing block coupled to the sealing member adjacent the plurality of electrolyte injection portions for sealing the electrolyte in the photoelectric cells together with the at least one injection portion sealing member; and
a sealing material between the sealing block and the sealing member, the sealing material comprising an adhering sheet adhering the sealing block to at least one of the first substrate or the second substrate, and a blocking sheet adjacent the adhering sheet for blocking leakage of the electrolyte from the photoelectric cells,
wherein the photoelectric cells comprise a first electrode on the first substrate, and a semiconductor layer on the first electrode,
wherein the sealing member extends between the first electrode of the adjacent photoelectric cells to the second substrate, and
wherein the adjacent photoelectric cells are electrically connected to each other through a connecting member formed of a conductive paste and extending within the sealing member between the first electrode of the adjacent photoelectric cells to the second substrate.

2. The photoelectric conversion module of claim 1, wherein the sealing member comprises a first portion surrounding the plurality of photoelectric cells and at least one second portion extending between the adjacent photoelectric cells in a second direction crossing the first direction.

3. The photoelectric conversion module of claim 2, wherein the connecting member connects the first electrode of a first photoelectric cell of the adjacent photoelectric cells and an electrode of a second photoelectric cell of the adjacent photoelectric cells.

4. The photoelectric conversion module of claim 2, wherein the connecting member extends within the at least one second portion of the sealing member in the second direction.

5. The photoelectric conversion module of claim 1, wherein the second substrate includes a portion extended beyond an end surface of the first substrate in a second direction crossing the first direction, and the sealing block is located on the extended portion of the second substrate and covers the end surface of the first substrate.

6. The photoelectric conversion module of claim 5, wherein the sealing material comprises a first sealing material portion between the sealing block and the end surface of the first substrate and a second sealing material portion between the sealing block and the extended portion of the second substrate.

7. The photoelectric conversion module of claim 6, wherein the first sealing material portion between the sealing block and the end surface of the first substrate and the second sealing material portion between the sealing block and the extended portion of the second substrate are continuously formed.

8. The photoelectric conversion module of claim 1, wherein the sealing material further comprises another adhering sheet, and the blocking sheet comprises a metal plate between the adhering sheet and the another adhering sheet.

9. The photoelectric conversion module of claim 1, wherein the semiconductor layer comprises a photosensitive dye.

10. The photoelectric conversion module of claim 1, wherein the photoelectric cells further comprise a second electrode on the second substrate.

11. The photoelectric conversion module of claim 10, wherein the photoelectric cells further comprise a catalyst layer on the second electrode.

* * * * *